United States Patent
Krummel et al.

(10) Patent No.: US 7,783,879 B2
(45) Date of Patent: Aug. 24, 2010

(54) METHOD AND DEVICE RELATING TO SECURITY IN A RADIO COMMUNICATION NETWORK

(75) Inventors: Holger Krummel, Bochum (DE); Stephan Hartwig, Essen (DE)

(73) Assignee: Nokia Corporation, Espoo (FI)

(*) Notice: Subject to any disclaimer, the term of this patent is extended or adjusted under 35 U.S.C. 154(b) by 341 days.

(21) Appl. No.: 10/576,975

(22) PCT Filed: Nov. 20, 2003

(86) PCT No.: PCT/IB03/06378

§ 371 (c)(1), (2), (4) Date: Apr. 20, 2006

(87) PCT Pub. No.: WO03/056746

PCT Pub. Date: Jul. 10, 2003

(65) Prior Publication Data

US 2007/0082732 A1 Apr. 12, 2007

(51) Int. Cl. *H04L 29/06* (2006.01)
(52) U.S. Cl. ........ 713/151; 713/150; 713/183; 713/171; 726/7; 380/283; 380/270; 455/41.2
(58) Field of Classification Search ........ None
See application file for complete search history.

(56) References Cited

U.S. PATENT DOCUMENTS

| | | | |
|---|---|---|---|
| 5,618,045 A | 4/1997 | Kagan et al. | 463/40 |
| 6,088,143 A * | 7/2000 | Bang | 398/106 |
| 6,928,295 B2 * | 8/2005 | Olson et al. | 455/522 |
| 7,127,541 B2 * | 10/2006 | Govindarajulu et al. | 710/300 |
| 7,142,814 B2 * | 11/2006 | Nassimi | 455/41.2 |
| 7,209,705 B2 * | 4/2007 | Moles et al. | 455/41.2 |
| 7,421,411 B2 * | 9/2008 | Kontio et al. | 705/52 |
| 7,467,302 B2 * | 12/2008 | Kao et al. | 713/183 |
| 2002/0077077 A1 * | 6/2002 | Rezvani et al. | 455/410 |
| 2002/0090912 A1 * | 7/2002 | Cannon et al. | 455/41 |
| 2002/0132605 A1 * | 9/2002 | Smeets et al. | 455/411 |
| 2002/0147766 A1 * | 10/2002 | Vanska et al. | 709/203 |
| 2003/0002678 A1 * | 1/2003 | Kim | 380/270 |

(Continued)

FOREIGN PATENT DOCUMENTS

JP 2002290412 A * 10/2002

(Continued)

OTHER PUBLICATIONS

"Specification of the Bluetooth System" Specification vol. 1, v1.0 B, XP-002175286, Dec. 1, 1999, pp. 149-178.

(Continued)

*Primary Examiner*—William R Korzuch
*Assistant Examiner*—Michael R Vaughan
(74) *Attorney, Agent, or Firm*—Harrington & Smith

(57) ABSTRACT

A method of joining a first device to a radio communications network controlled by a second device without contemporaneous user input of a secret at the second device, including: storing in the second device a secret generated at the second device; making the stored secret available in the first device; and creating in the first device and in the second device, using the secret, a secret key for use in securing communication between the first and second devices.

34 Claims, 3 Drawing Sheets

U.S. PATENT DOCUMENTS

| | | | |
|---|---|---|---|
| 2003/0093663 A1* | 5/2003 | Walker | 713/150 |
| 2003/0149875 A1* | 8/2003 | Hosaka | 713/168 |
| 2003/0204734 A1 | 10/2003 | Wheeler | 713/184 |
| 2004/0043790 A1* | 3/2004 | Ben-David et al. | 455/558 |
| 2004/0076300 A1* | 4/2004 | Ishidoshiro | 380/277 |
| 2004/0128509 A1* | 7/2004 | Gehrmann | 713/171 |
| 2004/0176071 A1* | 9/2004 | Gehrmann et al. | 455/411 |
| 2005/0021940 A1* | 1/2005 | Ma | 713/155 |
| 2005/0027910 A1* | 2/2005 | Barrett et al. | 710/62 |
| 2005/0107046 A1* | 5/2005 | Desbarats et al. | 455/90.3 |

FOREIGN PATENT DOCUMENTS

| | | |
|---|---|---|
| WO | WO 02/056536 A1 | 7/2002 |
| WO | WO 03/047135 A1 | 6/2003 |
| WO | WO 03/056746 A1 | 7/2003 |

OTHER PUBLICATIONS

"Specification of the Bluetooth System" Specification vol. 1, v1.0 B, XP-002175286, Nov. 29, 1999, Section 3, Pairing, pp. 195-197.

* cited by examiner

METHOD AND DEVICE RELATING TO SECURITY IN A RADIO COMMUNICATION NETWORK

TECHNICAL FIELD

Embodiments of the invention relate to a method and device relating to security in a radio communications network, particularly a low power radio communications network.

BACKGROUND OF THE INVENTION

Security keys are generally used in a radio communications network to authenticate users or devices and to encrypt data communicated in the network. This prevents one user or device masquerading as another user or device. It also prevents eavesdropping on communications in the network. A security key is a data string that is secret i.e., not generally known to users of the network.

Typically a control device manages the security keys of a network. When a new device attempts to join the network, the user of the control device tells the user of the new device a secret. e.g. a PIN. The user of the control device manually inputs the secret PIN to the control device and the user of the new device manually inputs the same secret PIN to the new device. The control device and the new device separately and symmetrically create a secret security key. This security key is necessary for authentication of the new device and/or encryption of communications between the devices.

When another new device attempts to join the network, the same process occurs except a different PIN is generally used.

Such security measures are, for example, used in a Bluetooth® piconet. The control device is a low power radio frequency transceiver device operating as a Master. The new device is a low power radio frequency transceiver device attempting to join the piconet as a Slave. The security key is an initialization key Kinit created during the Link Manager Protocol (LMP) pairing process. In Bluetooth, encryption and authentication use different keys and the initialisation key Kinit is used to ensure that a common link key, used in the authentication process, is shared by the Master device and the new Slave device.

It will therefore be appreciated to be disadvantageous that a user of the control device must enter data every time a new device attempts to join the network.

The inventors have realised that the user of the control device, if occupied in some other activity, must interrupt that activity to inform the new user of a new secret and enter the new secret to the device. This is particularly disadvantageous if the activity requires real time input such as a game.

BRIEF SUMMARY OF THE INVENTION

According to one aspect of the present invention there is provided a method of joining a first device to a radio communications network controlled by a second device without contemporaneous user input of a secret at the second device, comprising: storing in the second device a secret generated at the second device; making the stored secret available at the first device; and creating in the first device and in the second device, using the secret, a secret key for use in securing communication between the first and second devices.

According to another aspect of the present invention there is provided a method of joining a plurality of first devices to a radio communications network controlled by a second device, comprising: storing in the second device a generated secret at the second device; making the stored secret available to each of the first devices; and creating in the first devices and in the second device, using the secret, at least one secret key for use in securing communication between the first devices and the second device.

According to another aspect of the present invention there is provided a device for controlling a radio communications network comprising the device and one or more additional devices, the device comprising: a user interface for generating a secret by user input; a memory for storing a generated secret for use in securing communications in the network; a radio transceiver for communicating in the network; and a processor for accessing the secret stored in the memory and for creating, using the accessed secret, a secret key for securing communication.

According to another aspect of the present invention there is provided 31. A radio communications network having a common secret for re-use in securing communications in the network, the network comprising: a controlling device, for creating the network, comprising: a user interface for user input of a common secret; a memory for storing a common secret; a first radio transceiver for communicating in the network; and a first processor for accessing the common secret stored in the memory and for creating, using the accessed common secret, a secret key for securing communication, and a participating device, for participating in the network, comprising: input means for inputting the stored common secret to the participating device; a second radio transceiver for communicating in the network; and a second processor for creating, using the input common secret, the secret key for securing communication.

According to another aspect of the present invention there is provided a radio communications network having a common secret for re-use in securing communications in the network, the network comprising a controlling device, for creating the network, comprising: a user interface for user input of a common secret; a memory for storing a common secret; a first radio transceiver for communicating in the network; and a first processor for accessing the stored common secret in the memory and for creating, using the stored common secret, secret keys for securing communication between the controlling device and each of a plurality of participating devices, and a plurality of participating devices, for participating in the network, each comprising: input means for inputting a common secret to the participating device; a second radio transceiver for communicating in the network; and a second processor for creating, using the input common secret, a secret key for securing communication dependent upon the participating device and identical to one of the secret keys created in the controlling device.

It should be appreciated that although in embodiments of the invention, a first device is capable of being joined to a radio communications network controlled by a second device without contemporaneous user input of a secret at the second device, such embodiments do not exclude the possibility that it is also possible for a third device to be joined to the radio communications network controlled by the second device with contemporaneous user input of the same or a different secret at the second device. For example, while the third device is being joined to the network the user may contemporaneously input a secret, which is stored and re-used when the first device is subsequently joined to the network. The storage and re-use of the secret obviates the need for contemporaneous input of the secret when the first device is subsequently joined to the network.

BRIEF DESCRIPTION OF DRAWINGS

For a better understanding of the present invention reference will now be made by way of example only to the accompanying drawings in which:

FIG. 4 illustrates the pairing process according to one aspect of the present invention.

DETAILED DESCRIPTION OF EMBODIMENT(S) OF THE INVENTION

Figure 1A:
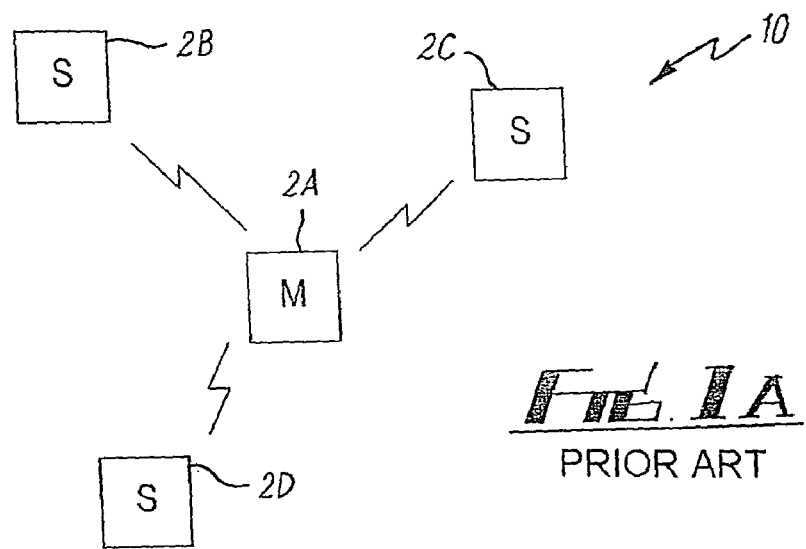
FIG. 1A illustrates a Bluetooth piconet.

FIG. 1A illustrates a low power radio communications network 10 (a piconet) comprising a plurality of low power radio transceiver devices 2A, 2B, 2C and 2D. The network is a 'star' network topology. The radio transceiver device 2A operates as a Master and the radio transceiver devices 2B, 2C and 2D operate as Slaves. The Master M establishes and controls the network 10 and the plurality of Slaves S participate in the network 10. The Slaves S do not communicate directly with each other. Each Slave S can only communicate with the Master M.

Figure 1B:
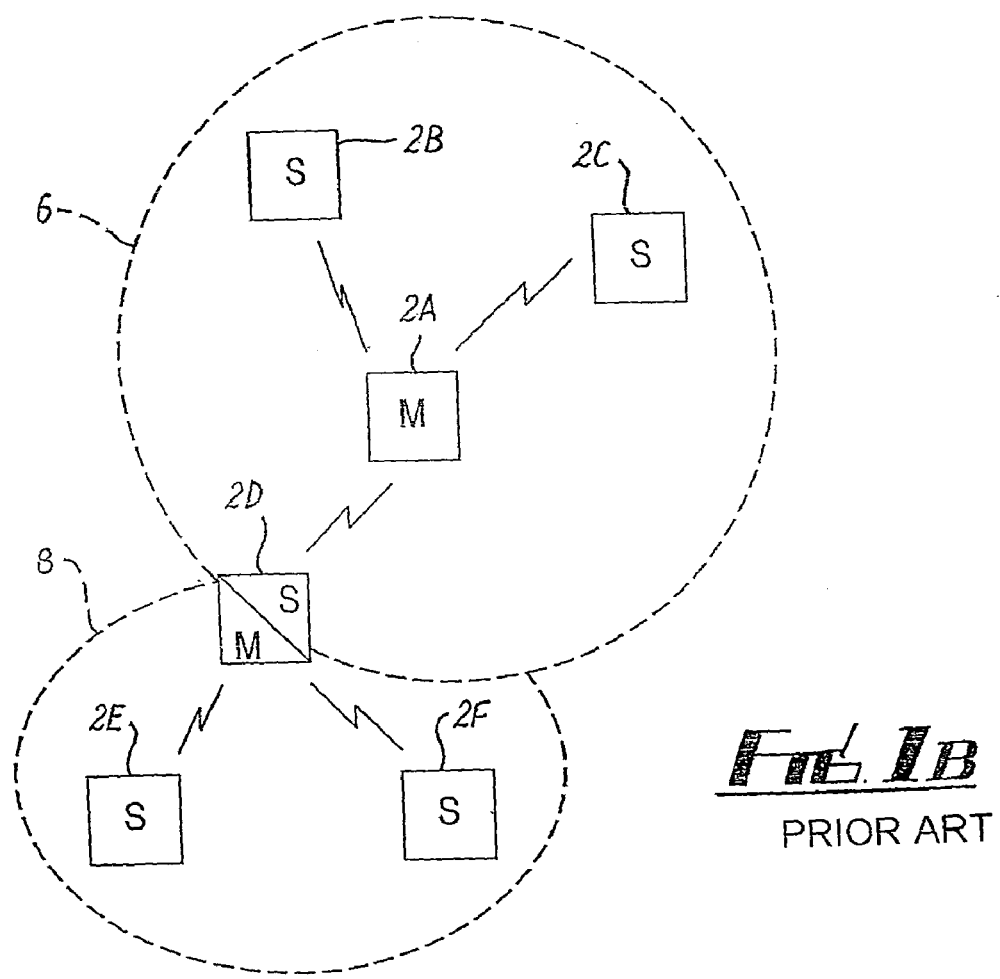
FIG. 1B illustrates a Bluetooth scatternet.

FIG. 1B illustrates a low power radio communications network 10 (a scatternet) comprising a plurality of low power radio transceiver devices 2A, 2B, 2C and 2D in a first piconet 6 and a plurality of low power radio frequency transceiver devices 2D, 2E and 2F in a second piconet 8. The first piconet 6 is a "star" network topology. The radio transceiver device 2A operates as a master and the radio transceiver devices 2B, 2C and 2D operate as slaves. The second piconet 8 is also a "star" network topology. The radio transceiver device 2D operates as a master and the radio transceiver devices 2E and 2F operate as slaves. In this scatternet topology, the low power radio transceiver device 2D operates as a slave in the first piconet 6 and operates as a master in the second piconet 8. It joins the first and second piconets to form the scatternet. The master M establishes and controls its piconet and the plurality of slaves S in the piconet do not communicate directly with each other. Each slave S can only communicate with the master M of the piconet.

The above described networks 10 are Bluetooth networks (a piconet in FIG. 1A and a scatternet in FIG. 1B) and each radio transceiver device operates in accordance with the Bluetooth Standard. A Bluetooth radio transceiver device must be 'paired' with a Master M before it can join the network. The pairing process includes the creation of a common link key, using a shared PIN, that is then used for authentication. In a piconet the same shared PIN is used for all the devices of the piconet. In a scatternet the same PIN is used for all the piconets of the scatternet.

Figure 2:
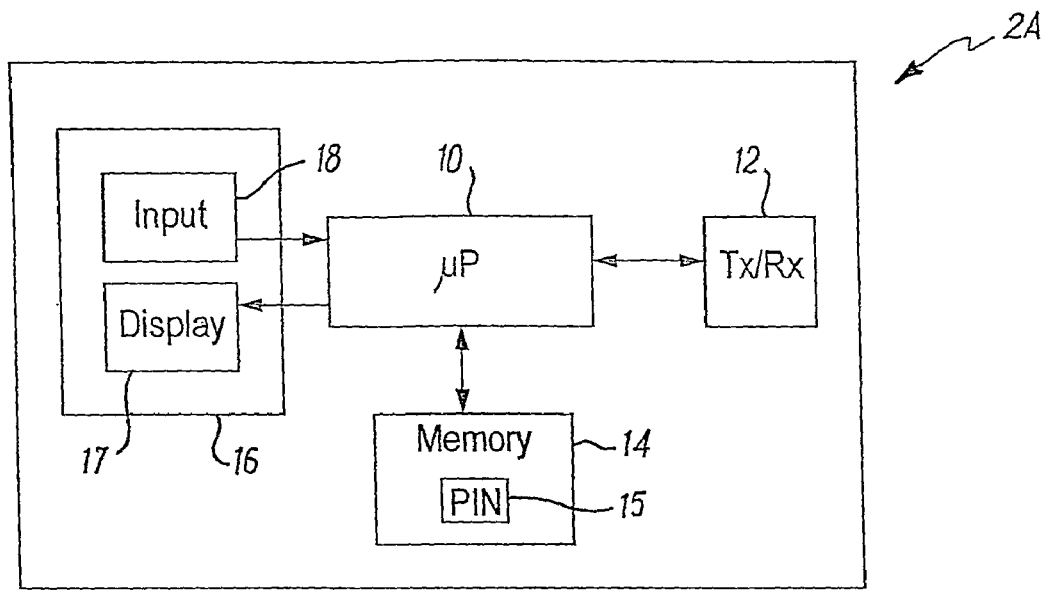
FIG. 2 illustrates a radio transceiver device in detail.

FIG. 2 illustrates the radio transceiver device 2A in more detail. The device 2A comprises a processor 10, a low power radio frequency transceiver 12, a memory 14 and a user interface 16. The user interface 16 comprises a display 17 that receives control signals from the processor 10 and an input device 18, such as a keypad, that provides control signals to the processor 10. The processor 10 is operable to write to and read from the memory 14. The processor 10 is also connected to the low power radio transceiver 12 to which it provides data for transmission in the network 10 and from which it is provided with data received from the network 10.

The memory 14 stores a shared secret PIN 15. The PIN is 'shared' because it is known to the users or devices that should be able to join the network. It is re-used in the pairing process when such a device joins the network. The PIN is 'secret' because it is not otherwise known. To prevent it becoming known it is generally distributed without communication within the network 10. This means, for example, that the PIN is communicated orally between the users.

The shared secret PIN, which is typically a string of alphanumeric characters, is generated once at the device 2A and stored in the memory 14 for re-use.

The shared secret PIN may be user generated at the device 2A e.g. the user may input the characters of the shared secret PIN via the input device 18. Alternatively, the device 2A may itself generate the shared secret PIN and display it to the user for sharing.

When a new device attempts to join the network 10, the device 2A automatically, without user intervention, accesses the stored shared secret PIN 15 and uses it in the required pairing process. The user of the device 2A is not therefore disturbed or interrupted. Thus use of a secret PIN that is shared and its storage in the device 2A obviates the need for the user of the device 2A to re-enter data each time a new device attempts to join the network.

Figure 3A:
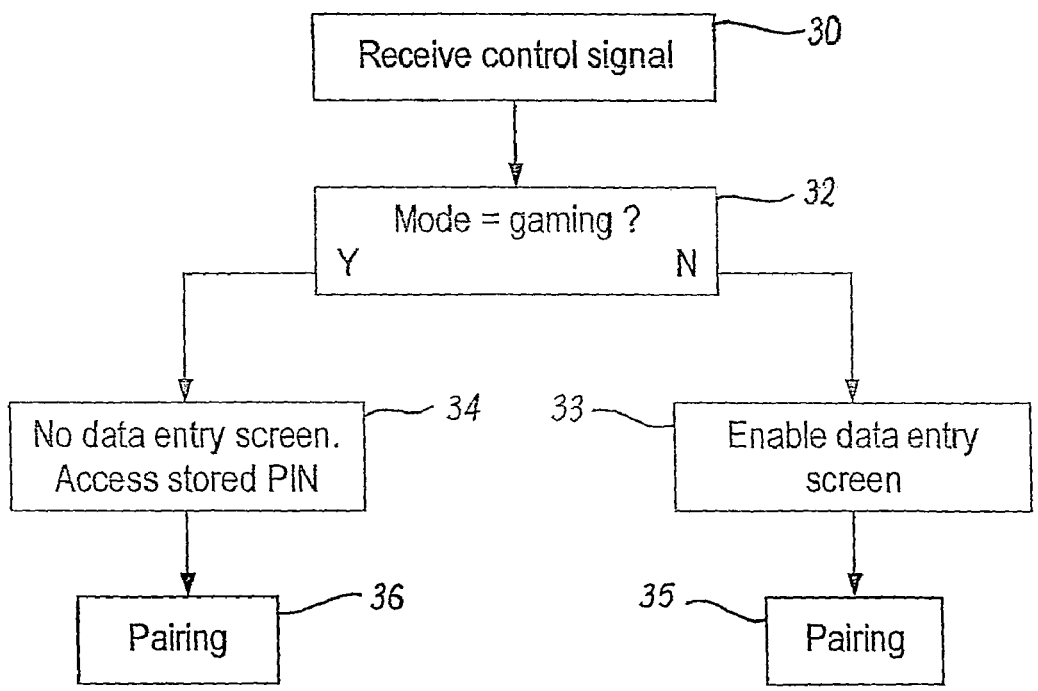
FIG. 3A illustrates a decision process according to one implementation of the present invention.

FIG. 3A illustrates a decision process that, in one embodiment, occurs in the device 2A. The device 2A has a plurality of different operational modes. There is at least one mode of operation in which it is undesirable to have interruptions to the user. This mode is typically one in which real time input is required from the user such as an interactive gaming mode. In the interactive gaming mode the network 10 is a gaming network and each of the devices 2 in the network are used to play an interactive game. Any interruption to the user of the device 2A during game play will detract from his enjoyment.

In this example, the memory 14 stores one or more shared secret PINs each of which is associated with an operational mode that should not be interrupted. One of the PINs is, for example, associated with a gaming mode and is used for automatic pairing while the device is in that mode.

Referring to FIG. 3A, at step 30 an initiation signal is received at the low power radio transceiver 12. The initiation signal indicates that the pairing process should occur. Referring to FIG. 4, it may, for example, be the message LMP_in-_rand or the message LMP_accepted.

At step 32, it is determined whether or not the device is in an interactive gaming mode or similar mode during which the user does not wish to be interrupted. If the device is not in a gaming mode the process branches to step 33, but if the device is in a gaming mode the process branches to step 34.

At step 33, a data screen or dialog is presented on the display 17 requesting the user input of data. The data entered is used as the PIN in the pairing process at step 35.

At step 34, the shared secret PIN 15 associated with the current mode of the device is read from the memory 14 for use in the pairing process at step 36.

It will therefore be appreciated that when a user is playing a game on a device that is Master of the network, he is not required to agree and enter a PIN each time a new user joins the network. A shared network PIN is defined to avoid repeated distribution of new PINs. The shared PIN is stored to prevent repeated user entry. The pairing process is initiated automatically without user intervention, thereby avoiding interruptions to the user.

The shared network PIN may be defined separately from and before the process of joining a new user to the network by pairing, for example, via a menu feature. Alternatively, the shared network PIN may be defined on creating the interactive network as a consequence of the first pairing process for that network. The PIN used for that first pairing process is then stored for re-use during the pairing processes when additional users join that network. Thus when additional users join the network the contemporaneous input of a PIN is not required at the master.

The device may allow a user to select which operational modes should not be interrupted.

Figure 3B:
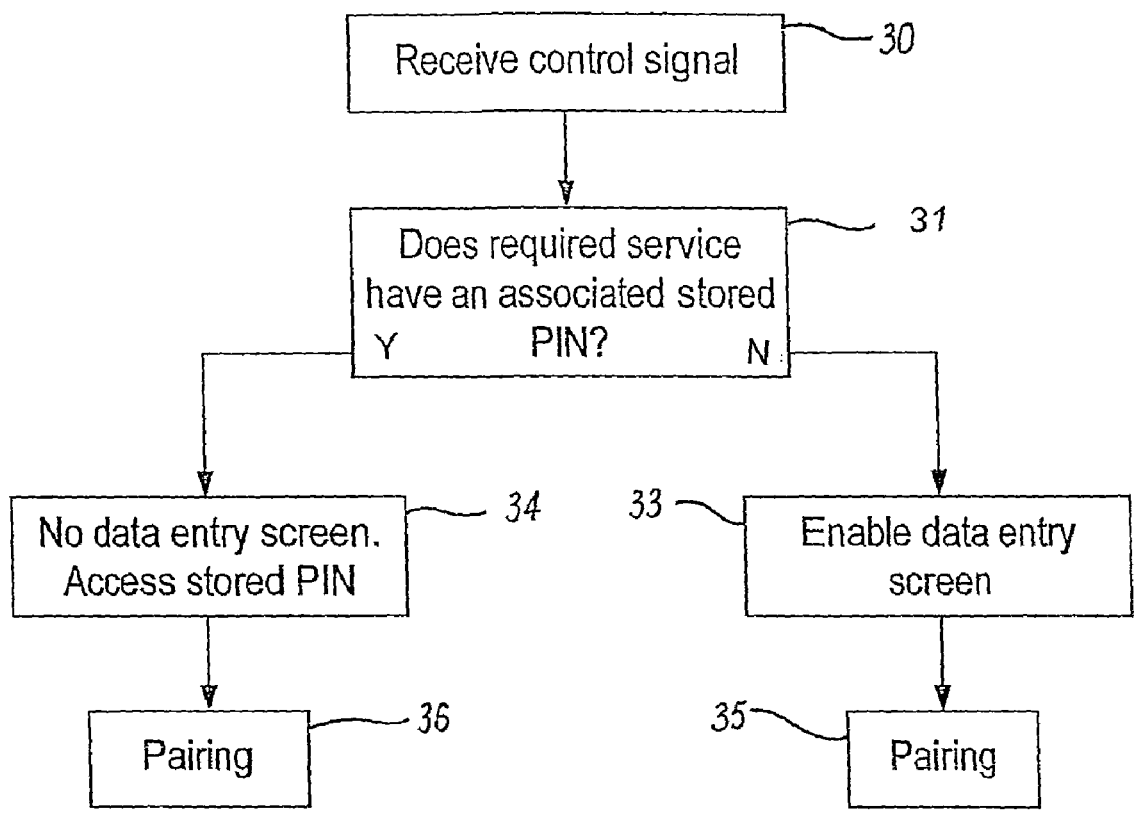
FIG. 3B illustrates a decision process according to another implementation of the present invention.

FIG. 3B illustrates a decision process that, in one embodiment, occurs in the device 2A. The device 2A provides one or more different services.

In this example, the memory 14 stores one or more shared secret PINs each of which is associated with a service provided by the device. One of the PINs may, for example, be associated with a gaming service and is used for automatic pairing prior to the provision of that service. One of the PINs may, for example, be associated with a mobile cellular telecommunications service and is used for automatic pairing prior to the provision of that service.

Referring to FIG. 3B, at step 30 an initiation signal is received at the low power radio transceiver 12. The initiation signal is the start of a request for a required service and indicates that the pairing process should occur. Referring to FIG. 4, it may, for example, be the message LMP_in_rand or the message LMP_accepted.

At step 31, it is determined whether or not the initiation signal is initiating a service that has an associated shared secret PIN. If there is no stored PIN associated with the required service or the required service cannot be identified then the process branches to step 33. If there is a stored PIN associated with the required service then the process branches to step 34.

At step 33, a data screen or dialog is presented on the display 17 requesting the user input of data. The data entered is used as the PIN in the pairing process at step 35.

At step 34, the shared secret PIN 15 associated with the required service is read from the memory 14 for use in the pairing process at step 36.

It will therefore be appreciated that whenever a new user requests a service from the Master, the user of the Master is not necessarily required to agree and enter a PIN. A shared network PIN is defined to avoid repeated distribution of new PINs. The shared PIN is stored to prevent repeated user entry. The pairing process is initiated automatically without user intervention, thereby avoiding interruptions to the user.

The shared network PIN may be defined separately from and before the process of joining a new user to the network by pairing, for example, via a menu feature. Alternatively, the shared network PIN may be defined on as a consequence of a first pairing process for a particular service. The PIN used for that first pairing process is then stored for re-use during the pairing processes when additional users join the network for that service. Thus when additional users join the network the contemporaneous input of a PIN is not required at the master.

The device may allow a user to select which service should have an associated PIN and to define the characters of the PIN.

In FIG. 4, an Initiator device initiates the pairing process and a Responder device responds. Typically the Initiator device will be a candidate Slave device seeking to join the network as a Slave and the Responder device will be the Master of the network. However, the roles may be reversed.

The stored shared secret PIN 15 is made available to those persons who the user of the Master wishes to be able to join the network 10. Typically this will be by verbal communication between the user of the Master and the other persons. In other embodiments it may be possible for the Master to communicate the stored shared secret PIN to other devices. However, such communication should not be via the network 10 if this would compromise the secrecy of the shared secret PIN 15. It may, if the devices are also mobile telephones, be via a data messaging service provided by a mobile telephone network, for example, SMS messaging.

The Initiator generates a random number RAND, at stage 21. At stage 22, the Initiator sends the random number RAND to the Responder in the signal LMP_in_rand. The Responder replies with LMP_accepted.

At stage 23, the user of the Master device is not required to input data. The device automatically accesses the shared secret PIN 15 that is stored in the memory 14. The user of the candidate Slave device manually inputs the shared secret PIN.

The candidate Slave device may save the shared secret PIN for future use when it is master of the piconet.

At stage 24, there is symmetric creation of an initialization key Kinit at both the Initiator and the Responder. The algorithm for creating Kinit takes as its inputs the random number RAND, the shared secret PIN, and the Bluetooth Device address (BD_ADDR) of the Responder device. The BD_ADDR is an identifier of the Responder Device that is permanently stored in the Responder device and is previously transferred to the Initiator device e.g. during the Inquiry procedure. The initialisation key Kinit is used to enable authentication.

At stage 25, there is a handshake between the Responder and the Initiator to determine whether a combination link key or a unit link key should be used as a common link key.

At stage 26, the common link key is generated and shared between the Initiator and Responder. The common link key is used in authentication between the two devices for all subsequent connections until it is changed.

The Responder and Initiator use the same algorithm to generate the link key.

If a unit link key is to be used, the initialisation key Kinit is used to encrypt the unit link key during communication from one device to the other via the network 1. If for example, the unit link key of the Initiator is to be used, it is XORed with Kinit and the result is sent to the Responder, where it is XORed with Kinit to recover the original unit link key.

If a combination link key is used, an Initiator specific link key is created in the Initiator using its Bluetooth device address (BD_ADDR) and a locally generated random number, and a Responder specific link key is created in the Responder using its Bluetooth device address (BD_ADDR) and a locally generated random number. The Initiator and Responder then exchange their locally generated random numbers. The Initiator then creates the Responder specific link key and the Responder creates the Initiator specific link key. Each of the Responder and Initiator then creates the same combination link key using both the Responder specific link key and the Initiator specific link key.

The initialisation key Kinit is used to encrypt the locally generated random numbers before they are exchanged via the network 10. The random number key is XORed with Kinit at its origin and the result when received at the destination is XORed with Kinit to recover the random number.

Thus the Initialisation key Kinit is used in the generation and sharing of the link key.

At stage 27, mutual authentication based on the common link key occurs. The common link key is used in a challenge response mechanism. A first signed response is calculated in the Responder based on at least a random value and the common link key. The random value is transferred to the Initiator where a second signed response is calculated based on at least the transferred random value and the common link key. The second signed response is transferred to the Responder and compared with the first signed response. If they agree the Initiator is authenticated by the Responder. The process is mutual because the Responder is then authenticated by the Responder.

Although embodiments of the present invention have been described in the preceding paragraphs with reference to various examples, it should be appreciated that modifications to the examples given can be made without departing from the scope of the invention as claimed. For example, although the above described embodiments relate a Bluetooth network, embodiments of the invention are not limited to Bluetooth networks and devices nor are they limited to a network with a star topology. In Bluetooth, encryption and authentication are separated, so a separate encryption key is generated if required. However, in other systems, the equivalent of the common link key could also be used in addition or in the alternative for encryption. Also the key created directly from the shared secret PIN could be used, in systems less secure than Bluetooth, as an authentication key or an encryption key.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, comprising:
generating by a first apparatus which controls access to a low power radio communications network a shared secret at the first apparatus and storing the shared secret in a memory of the first apparatus, wherein the stored secret is associated with an operational mode of the first apparatus where a user of the first apparatus is not to be interrupted and where the stored secret is used for automatic pairing when the first apparatus is in the operational mode;
making the stored shared secret available at a second apparatus;
receiving a signal from the second apparatus to initiate a pairing process with the first apparatus on the low power radio communications network, where the signal comprises a request to pair with the first apparatus for a required service from the first apparatus;
determining whether the first apparatus is in the operational mode where the user of the first apparatus is not to be interrupted and whether the required service is associated with the stored shared secret; and
for the case where it is determined that the first apparatus is in the operational mode where the user of the first apparatus is not to be interrupted and the required service is associated with the stored shared secret, then initiating the pairing process, automatically with no intervention from the user of the first apparatus, using the stored shared secret or else
prompting the user of the first apparatus to enter a shared secret associated with the requested service and initiating the pairing process using the user entered shared secret.

2. The method as claimed in claim 1, where the initiated pairing process comprises an algorithm that uses one of the stored shared secret and the shared secret entered by the user as an input to the algorithm.

3. The method as claimed in claim 2, wherein the algorithm creates a secret key for use in the pairing process and where the secret key uses a random number communicated between the first apparatus and the second apparatus.

4. The method as claimed in claim 3, wherein the algorithm creating the secret key uses an identifier of one of the first apparatus and the second apparatus, communicated between the first apparatus and the second apparatus, in the creation of the secret key.

5. The method as claimed in claim 1, further comprising, based on the initiated pairing process, establishing the communication with the second apparatus and providing the requested service to the second apparatus.

6. The method as claimed in claim 1, wherein the determined operational mode comprises a gaming mode.

7. The method as claimed in claim 1, further comprising, selecting the operational modes in which the user of the first apparatus is not to be interrupted.

8. The method as claimed in claim 1, where the required service comprises a gaming service.

9. The method as claimed in claim 1, wherein making the stored shared secret available at the second apparatus involves prompting a user input of the shared secret at the second apparatus.

10. The method as claimed in claim 1 where the shared secret comprises a secret PIN.

11. The method as claimed in claim 1, further comprising:
re-using the stored shared secret to join a third apparatus to the low power radio communications network without contemporaneous user input of the shared secret at the first apparatus, comprising: making the stored shared secret available at the third apparatus; and
creating in the first apparatus, using the shared secret, a secret key; and making the secret key available to the third apparatus for use in pairing the third apparatus and the first apparatus to secure communication between them.

12. A method, comprising:
receive at a second apparatus of a low power radio communications network a shared secret;
sending a signal to a first apparatus to initiate a pairing process in the low power radio communications network with the first apparatus, where the signal comprises a request to pair with the first apparatus for a required service from the first apparatus, where the signal to initiate the pairing process prompts the first apparatus to determine whether the first apparatus is in an operational mode where a user of the first apparatus is not to be interrupted and whether the required service is associated with a shared secret stored on the first apparatus for use in automatic pairing when the first apparatus is in the operational mode; and
for the case where it is determined that the first apparatus is in the operational mode where the user of the first apparatus is not to be interrupted and the required service is associated with the shared secret stored on the first apparatus, then receiving an acceptance message from the first apparatus and inputting, at the second apparatus, the shared secret received at the second apparatus for the pairing process, where the pairing process is initiated automatically on the first apparatus with no intervention from the user of the first apparatus, using the shared secret stored on the first apparatus, or else the signal to initiate the pairing process prompts the user of the first apparatus to enter a shared secret associated with the requested service for the pairing process.

13. The method as claimed in claim 12, where the initiated pairing process comprises an algorithm that uses one of the stored shared secret and the shared secret entered by the user of the first apparatus as an input to the algorithm.

14. An apparatus comprising:
   at least one processor; and
   at least one memory including computer readable instructions, where the at least one memory and the computer readable instructions are configured, with the at least one processor, to cause the apparatus to at least:
   store a shared secret for use in securing communications in a low power radio communications network comprising the apparatus and one or more additional apparatus, wherein the stored shared secret is associated with an operational mode of the apparatus where a user of the apparatus is not to be interrupted and where the stored secret is used for automatic pairing when the apparatus is in the operational mode;
   communicate in the low power radio communications network and receive a signal from the one or more additional apparatus to initiate a pairing process with the apparatus on the low power radio communications network, where the signal comprises a request to pair with the apparatus for a required service from the apparatus;
   determine whether the apparatus is in an operational mode where the user of the apparatus is not to be interrupted and whether the required service is associated with the stored shared secret; and
   for the case where it is determined that the apparatus is in the operational mode where the user of the apparatus is not to be interrupted and the required service is associated with the stored shared secret, initiate the pairing process, automatically with no intervention from the user of the apparatus, using the stored shared secret, or else
   prompt the user of the apparatus to enter a secret associated with the requested service and initiate the pairing process using the user entered shared secret.

15. The apparatus as claimed in claim 14, where the initiated pairing process comprises an algorithm that uses one of the stored secret and the secret entered by the user as an input to the algorithm.

16. The apparatus as claimed in claim 15, further comprising the apparatus is caused to program the value of the stored shared secret.

17. The apparatus as claimed in claim 14, wherein the operational mode comprises a game mode.

18. The apparatus as claimed in claim 14, wherein the required service comprises a gaming service.

19. The apparatus as claimed in claim 14, comprising the apparatus is caused, in response to the determining, to access the secret in the memory to create a secret key for use in the pairing process without user intervention.

20. The apparatus as claimed in claim 19, wherein the apparatus is caused to automatically create the secret key in response to the received signal.

21. The apparatus as claimed in claim 19, wherein the secret key is dependent upon an origin of the received signal.

22. The apparatus as claimed in claim 19, wherein the secret key is dependent upon content of the received request.

23. The apparatus as claimed in claim 22, wherein the request includes a random value used with at least the stored shared secret to create the secret key.

24. The apparatus as claimed in claim 14, wherein the stored shared secret is independent of an origin of the received signal.

25. The apparatus as claimed in claim 14, wherein the apparatus is caused, in a first mode, to obtain a secret by accessing the shared secret stored in the memory, in a second mode, to obtain a shared secret by enabling user input of data, in the first mode and in the second mode, to create, using the obtained shared secret, the secret key for use in pairing the apparatus and the one or more additional apparatus to secure communication between them.

26. The apparatus as claimed in claim 25, wherein the first mode is an interactive gaming mode and second mode is an idle mode.

27. The apparatus as claimed in claim 14, wherein the apparatus is caused to store an apparatus identifier for use with at least the stored shared secret to create the secret key.

28. The apparatus as claimed in claim 14, wherein the secret key is for use in securing all communications in the low power radio communications network.

29. The apparatus as claimed in claim 14, further comprising the apparatus is caused, when the apparatus participates in a different low power radio communications network controlled by a different apparatus, to enter a shared secret stored at the different apparatus and to create, using the entered shared secret, a secret key for securing communication.

30. An apparatus comprising:
   at least one processor; and
   at least one memory including computer readable instructions, where the at least one memory and the computer readable instructions are configured, with the at least one processor, to cause the apparatus to at least:
   communicate on a low power radio communications network;
   receive at the apparatus a shared secret for use in securing communications in the low power radio communications network;
   send a signal to a device to initiate a pairing process in the low power radio communications network with the device, where the signal comprises a request to pair with the device for a required service from the device, where the signal to initiate the pairing process prompts the device to determine whether the device is in an operational mode where a user of the device is not to be interrupted and whether the required service is associated with a stored shared secret on the device for use in automatic pairing when the device is in the operational mode; and
   for the case where it is determined that the device is in the operational mode where the user of the device is not to be interrupted and the required service is associated with the shared secret stored on the device, then receive an acceptance message from the device and input, at the apparatus, the shared secret received at the apparatus for the pairing process, where the pairing process is initiated automatically on the device with no intervention from the user of the device, using the shared secret stored on the device, or else
   prompt the user of the device to enter a shared secret associated with the requested service for the initiated pairing process.

31. The apparatus as claimed in claim 30 where initiating the pairing process comprises using an algorithm and where the algorithm uses one of the stored shared secret and the shared secret entered by the user of the device as an input to the algorithm.

32. A memory embodying a program of computer readable instructions that when executed by a processor perform actions directed to securing communication between a first and second apparatus, the actions comprising:

generating a shared secret at the first apparatus which controls access to a low power radio communications network and storing the shared secret in a memory of the first apparatus, wherein the stored shared secret is associated with an operational mode of the first apparatus where a user of the first apparatus is not to be interrupted and where the stored shared secret is used for automatic pairing when the first apparatus is in the operational mode;

making the stored shared secret available at the second apparatus;

receiving a signal from the second apparatus to initiate a pairing process with the first apparatus on the low power radio communications network, where the signal comprises a request to pair with the first apparatus for a required service from the first apparatus;

determining whether the first apparatus is in an operational mode where the user of the first apparatus is not to be interrupted and whether the required service is associated with the stored shared secret; and for the case where it is determined that the first apparatus is in the operational mode where the user of the first apparatus is not to be interrupted and the required service is associated with the stored shared secret then initiating the pairing process, automatically with no intervention from the user of the first apparatus, using the stored shared secret, or else prompting the user of the first apparatus to enter a shared secret associated with the requested service and initiate the pairing process with the second apparatus using the user entered shared secret.

33. The memory embodying instructions executable by a processor of claim 32, where initiating the pairing process comprises using an algorithm and where the algorithm uses one of the stored shared secret and the shared secret entered by the user as an input to the algorithm.

34. The memory embodying instructions executable by a processor of claim 32, wherein the operational mode comprises a game mode.

* * * * *